United States Patent
Shestak et al.

(10) Patent No.: US 10,942,490 B2
(45) Date of Patent: Mar. 9, 2021

(54) HOLOGRAM REPRODUCING APPARATUS AND METHOD THEREOF

(71) Applicant: Samsung Electronics Co., Ltd., Suwon-si (KR)

(72) Inventors: Sergey Shestak, Seoul (KR); Dae-sik Kim, Suwon-si (KR); Seon-deok Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 15/870,084

(22) Filed: Jan. 12, 2018

(65) Prior Publication Data
US 2018/0341223 A1 Nov. 29, 2018

(30) Foreign Application Priority Data
May 23, 2017 (KR) .................. 10-2017-0063562

(51) Int. Cl.
*G03H 1/22* (2006.01)
*G02B 6/08* (2006.01)
(Continued)

(52) U.S. Cl.
CPC ......... *G03H 1/2294* (2013.01); *G02B 6/0033* (2013.01); *G02B 6/0041* (2013.01);
(Continued)

(58) Field of Classification Search
CPC .. G03H 1/2294; G03H 1/2205; G03H 1/2286; G03H 2001/0224;
(Continued)

(56) References Cited

U.S. PATENT DOCUMENTS

| 5,245,453 A | 9/1993 | Hatano et al. |
| 6,654,156 B1 * | 11/2003 | Crossland ............ H04N 5/7458 348/751 |

(Continued)

FOREIGN PATENT DOCUMENTS

| KR | 10-2013-0123368 A | 11/2013 |
| KR | 10-2016-0104235 A | 9/2016 |

OTHER PUBLICATIONS

Myers "Introductory Solid State Physics, Second Edition" pp. 48-53 (Year: 1997).*

(Continued)

*Primary Examiner* — George G King
(74) *Attorney, Agent, or Firm* — Jefferson IP Law, LLP (57) ABSTRACT

A hologram reproducing apparatus is provided that includes a display configured to emit a write beam corresponding to a hologram pattern, a spatial light modulator (SLM) configured to write the hologram pattern according to the write beam and modulate the reproduction beam into a plurality of diffraction beams corresponding to the hologram pattern if a reproduction beam is incident, a light guide plate disposed in a front surface of the SLM, and configured to guide the reproduction beam toward the SLM, a filter configured to filter the plurality of diffraction beams, a lens configured to focus the plurality of diffraction beams filtered through the filter, and a plurality of optical fibers arranged in order to dispose at least one optical fiber to correspond to each of a plurality of pixels included in the display, and configured to transmit the write beam to the SLM.

11 Claims, 9 Drawing Sheets

(51) Int. Cl.
*F21V 8/00* (2006.01)
*G02F 1/1335* (2006.01)
*G03H 1/02* (2006.01)

(52) U.S. Cl.
CPC ............. *G02B 6/0043* (2013.01); *G02B 6/08* (2013.01); *G03H 1/2205* (2013.01); *G03H 1/2286* (2013.01); *G02B 6/0011* (2013.01); *G02F 1/133526* (2013.01); *G03H 2001/0224* (2013.01); *G03H 2001/221* (2013.01); *G03H 2001/2207* (2013.01); *G03H 2223/12* (2013.01); *G03H 2223/16* (2013.01); *G03H 2225/25* (2013.01)

(58) Field of Classification Search
CPC ..... G03H 2001/2207; G03H 2001/221; G03H 2223/12; G03H 2223/16; G03H 2225/25; G02B 6/0033; G02B 6/0041; G02B 6/0043; G02B 6/08; G02B 6/0011; G02F 1/133526
See application file for complete search history.

(56) References Cited

U.S. PATENT DOCUMENTS

| | | |
|---|---|---|
| 6,927,748 B2 | 8/2005 | Hughes et al. |
| 9,395,690 B2 | 7/2016 | Futterer |
| 2007/0052929 A1* | 3/2007 | Allman ................ G02B 6/0026 353/31 |
| 2008/0144174 A1 | 6/2008 | Lucente et al. |
| 2010/0027083 A1* | 2/2010 | Kroll ........................ G03H 1/02 359/9 |
| 2010/0046050 A1 | 2/2010 | Kroll et al. |
| 2010/0284180 A1* | 11/2010 | Popovich ............. G02B 27/102 362/231 |
| 2012/0050459 A1 | 3/2012 | Yoon et al. |
| 2012/0086994 A1* | 4/2012 | Choi .................... G03H 1/2294 359/9 |
| 2018/0031763 A1* | 2/2018 | Ellwood, Jr. ...... G02B 6/12002 |

OTHER PUBLICATIONS

Fukushima et al., Real-Time Hologram Construction and Reconstruction Using a High-Resolution Spatial Light Modulator, Appl. Phys. Lett. 58 (8), Feb. 25, 1991, pp. 787-789.

Collings et al., Optically Addressed Spatial Light Modulator: Performance and Applications, Proceedings of SPIE, 2003, pp. 40-48, vol. 5213 Liquid Crystals VII.

Kirzhner et al., Liquid Crystal High-Resolution Optically Addressed Spatial Light Modulator Using a Nanodimensional Chalcogenide Photosensor, Optics Letters 2014, pp. 2048-2051, vol. 39, No. 7.

Pyun et al., Compact Holographic Printer Using RGB Waveguide Holographic Optical Elements, MOEMS and Miniaturized Systems XII, Proc. of SPIE vol. 8616, 86160R (2013).

* cited by examiner

FIG. 7

HOLOGRAM REPRODUCING APPARATUS AND METHOD THEREOF

CROSS-REFERENCE TO RELATED APPLICATION(S)

This application claims the benefit under 35 U.S.C. § 119(a) of a Korean patent application filed on May 23, 2017 in the Korean Intellectual Property Office and assigned Serial number 10-2017-0063562, the entire disclosure of which is hereby incorporated by reference.

TECHNICAL FIELD

The present disclosure relates to a hologram reproducing apparatus and a control method thereof. More particularly, the present disclosure relates to a hologram reproducing apparatus provided with a spatial light modulator (SLM) and a control method thereof.

BACKGROUND

In accordance with a recent development of three-dimensional (3D) display technology, 3D images are used in various industrial fields. Particularly, research on holograms that reproduce objects in an accurate manner is actively carried out and at the same time, contents using holograms are being produced in various fields such as broadcasting, exhibition, and performance.

A hologram reproduces an object using a phenomenon of coherence of light. If a computer-generated hologram (CGH) pattern generated using a computer is provided to a spatial light modulator (SLM), the SLM generates a holographic image by diffracting a reproduction beam.

A viewing angle, resolution, etc. for the holographic image are determined by a pixel pitch of the SLM. Currently, commercialized SLM products with the pixel pitch of 10 μm or less are few, and accordingly only a holographic image of a limited viewing angle and a low resolution may be provided.

Thus, there has been developed an optically addressed SLM that is not affected by the pixel pitch and records and reproduces the CGH pattern by light.

However, a related-art optically addressed SLM has been implemented only with a large bulky shape including a plurality of bulky lenses, beam splitter and the like and may not effectively block a 0th order diffraction beam, which causes a problem in generating cross talk between a plurality of diffraction beams.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a hologram reproducing apparatus that may reduce a size of the hologram reproducing apparatus and provide a high-quality holographic image and a control method thereof.

In accordance with an aspect of the present disclosure, a hologram reproducing apparatus is provided. The hologram reproducing apparatus includes a display configured to emit a write beam corresponding to a hologram pattern, an optically addressed spatial light modulator (SLM) disposed in a front surface of the display, configured to write the hologram pattern according to the write beam emitted from the display, if a reproduction beam is incident, and modulate the reproduction beam into a plurality of diffraction beams corresponding to the reconstructed holographic image, a light guide plate disposed in a front surface of the SLM and configured simultaneously to guide the reproduction beam toward the SLM and to allow the plurality of diffraction beams to pass through toward the viewer, a filter disposed in a front surface of the light guide plate and configured to filter the plurality of diffraction beams, a lens configured to focus the plurality of diffraction beams filtered through the filter, and a plurality of optical fibers arranged to allow at least one optical fiber to correspond to each of a plurality of pixels included in the display and configured to transmit the write beam to the SLM.

The display may include a display panel configured to display the hologram pattern, and the plurality of optical fibers may be arranged in a front surface of the display panel facing the SLM.

The display panel may include a plurality of display modules, and the plurality of optical fibers arranged to correspond to boundary regions between the plurality of display modules may have a tapered shape.

SLM may include a photosensitive layer configured to write the hologram pattern according to the write beam, a block filter disposed in a front surface of the photosensitive layer and configured to block the write beam, and a liquid crystal layer disposed on a front surface of the block filter to modulate the incident reproduction beam into a plurality of diffraction beams corresponding to the hologram pattern, and the plurality of optical fibers may be arranged in a rear surface of the photosensitive layer facing the display.

The light guide plate may include an expander (or a beam expander) configured to collimate the reproduction beam to make the reproduction beam uniformly incident on a rear surface of the SLM, and an in-coupling element configured to allow an incidence angle of the reproduction beam incident on the expander to fall within a predetermined angle range, and the in-coupling element may be implemented as a Bragg grating element or a prism.

The light guide plate may include an expander configured to collimate the reproduction beam to make the reproduction beam uniformly incident on a front surface of the SLM, and an out-coupling element disposed in a rear surface of the expander to refract the reproduction beam incident on the expander at a predetermined angle and emit the reproduction beam to an outside of the expander, and the out-coupling element may be implemented as a Bragg grating element.

The out-coupling element may refract and emit the reproduction beam incident on the expander at the predetermined index based on an equation below, $$\theta = \text{Arcsin}(n\lambda/2d)$$

where n denotes a refractive index of the Bragg grating element, λ denotes a wavelength of a reproduction beam, and d denotes a distance between the Bragg grating element.

The filter may include a Bragg grating filter, if the plurality of diffraction beams are incident, the Bragg grating filter may allow a diffraction beam incident within a predetermined angle range to pass through based on a zero order diffraction beam among the plurality of diffraction beams, and the zero order diffraction beam may be a beam in which the reproduction beam is reflected without being modulated to a diffraction beam in the SLM.

The filter may further include a louver film disposed in a front surface of the Bragg grating filter to secondarily filter the diffraction beam primarily filtered through the Bragg grating filter.

The display may be implemented as a self-luminous element that emits the write beam corresponding to the hologram pattern.

The light guide plate may be implemented as a Bragg grating element to refract the reproduction beam at a predetermined angle and emit the reproduction beam toward the SLM.

In accordance with another aspect of the present disclosure, a control method of a hologram reproducing apparatus including a display configured to emit a write beam corresponding to a hologram pattern is provided. The control method includes transmitting the write beam emitted from the display to a SLM through a plurality of optical fibers arranged in order to allow at least one optical fiber to correspond to each of a plurality of pixels included in the display, writing a hologram pattern corresponding to the write beam by the SLM disposed in a front surface of the display, modulating a reproduction beam incident on the SLM into a plurality of diffraction beams corresponding to the hologram pattern, filtering the plurality of diffraction beams by a filter disposed on a front surface of a light guide plate, and focusing the filtered plurality of diffraction beams by a lens disposed on a front surface of the filter.

The display may include a display panel configured to display the hologram pattern, and the plurality of optical fibers may be arranged in a front surface of the display panel facing the SLM.

The SLM may include a photosensitive layer configured to write the hologram pattern according to the write beam, a block filter (or a dielectric mirror layer) disposed in a front surface of the photosensitive layer and configured to block (or reflect) the write (reconstruction) beam, and a LCD panel (liquid crystal layer) disposed on a front surface of the block filter to modulate the incident reproduction beam into a plurality of diffraction beams corresponding to the hologram pattern, and the plurality of optical fibers may be arranged in a rear surface of the photosensitive layer facing the display.

The light guide plate disposed in a front surface of the SLM may include an expander and an out-coupling element, the control method may further include collimating the reproduction beam by the expander to make the reproduction beam uniformly incident on the front surface of the SLM, and refracting the reproduction beam incident on the expander by the out-coupling element disposed on a rear surface of the expander at a predetermined angle and emitting the reproduction beam to the outside of the expander.

The emitting may include refracting and emitting the reproduction beam at the predetermined angle based on an equation below, $$\theta = \text{Arcsin}(n\lambda/2d)$$

where n denotes a refractive index of the Bragg grating element, λ denotes a wavelength of a reproduction beam, and d denotes a distance between the Bragg grating element.

The filter may include a Bragg grating filter, if the plurality of diffraction beams are incident, the Bragg grating filter may allow a diffraction beam incident within a predetermined angle range to pass through based on a zero order diffraction beam among the plurality of diffraction beams, and the zero order diffraction beam may be a beam in which the reproduction beam is reflected without being modulated to a diffraction beam in the SLM.

The filter may further include a louver film disposed in a front surface of the Bragg grating filter to secondarily filter the diffraction beam primarily filtered through the Bragg grating filter.

The display may be implemented as a plurality of self-luminous elements that emit the write beam corresponding to the hologram pattern.

The light guide plate may be implemented as a Bragg grating element, and the control method may further include refracting the reproduction beam by the Bragg grating element at a predetermined angle and emit the reproduction beam toward the SLM.

As described above, according to various embodiments of the present disclosure, the hologram reproducing apparatus may be miniaturized and may provide a high-quality holographic image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, to "include" an element means that it may include other elements, rather than excluding other elements, unless specifically stated otherwise. Further, various elements and regions in the drawings are schematically drawn. Accordingly, the technical spirit of the present disclosure is not limited by the relative size or spacing depicted in the accompanying drawings.

Figure 1:
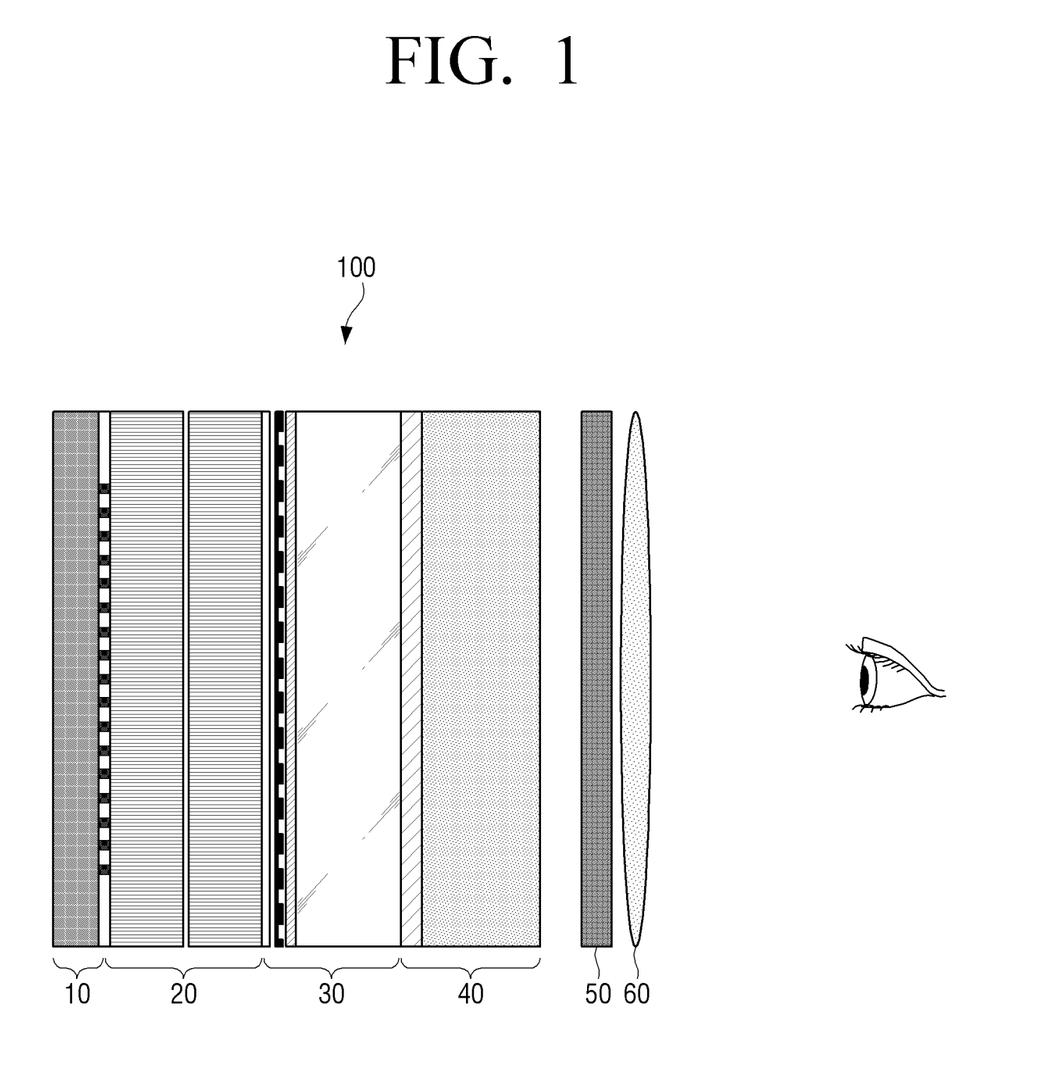
FIG. 1 is a diagram for explaining a hologram reproducing apparatus according to an embodiment of the present disclosure.

FIG. 1 is a diagram for explaining a hologram reproducing apparatus 100 according to an embodiment of the present disclosure.

Referring to FIG. 1, the hologram reproducing apparatus 100 based on a spatial light modulator (SLM) may include a display 10, a plurality of optical fibers 20, a SLM 30, a light guide plate 40, a filter 50, and a lens 60.

The display 10 displays a hologram pattern. The hologram reproducing apparatus 100 may be connected to a computer apparatus (not shown) by wired or wirelessly to receive information on the hologram pattern, and may display the hologram pattern through the display 10 according to an embodiment. For example, a computer apparatus (not shown) may generate a computer-generated hologram (CGH) pattern through CGH processing on an input image and transmit the CGH pattern to the hologram reproduction apparatus 100. A CGH pattern received from an external server or the like may be stored in the hologram reproducing apparatus 100 according to another embodiment. According to another embodiment, when the hologram reproducing apparatus 100 has a computing function, the hologram reproducing apparatus 100 may directly generate a CGH pattern. However, it is needless to say that the hologram pattern is not limited to the CGH pattern generated through CGH processing, and may include stereoscopic information about an object generated by using various apparatuses such as a coherence pattern generated using laser light.

The display 10 may emit a write beam corresponding to the displayed hologram pattern.

The display 10 according to an embodiment of the present disclosure may be implemented as a micro display. When the display 10 is implemented as a display requiring a separate light source such as a liquid crystal display (LCD), a light source unit (e.g., a backlight) provided inside or outside the display 10 may irradiate a coherence light source to the display 10, and the irradiated light source may be emitted as a write beam corresponding to the hologram pattern.

According to another embodiment, the display 10 may be implemented as a plurality of self-luminous elements which is turned on/off and may be controllable in the level of luminosity in units of pixels in accordance with a hologram pattern, and may emit the write beam by itself. For example, the self-luminous element may be implemented as an light emitting diode (LED) organic light-emitting diode (OLED), active-matrix OLED (AMOLED), etc., but is not limited thereto. The display 10 may be implemented by various types of display devices that emit the write beam corresponding to the hologram pattern. The write beam emitted from the display 10, that is, the write beam corresponding to the hologram pattern, may be incident on the SLM 30 through the plurality of optical fibers 20. Here, the plurality of optical fibers 20 are optical fiber bundles which are arranged so that at least one optical fiber corresponds to each of a plurality of pixels constituting the display 10 and transmits the write beam to the SLM 30. Here, the plurality of optical fibers 20 may be implemented in a configuration separate from the display 10 or the SLM 30 but are not limited thereto. The plurality of optical fibers 20 may be included as one component of at least one of the display 10 or the SLM 30 to transmit the write beam from the display 10 to the SLM 30.

According to an embodiment, when the plurality of optical fibers 20 are included in the display 10, the display 10 may pass through the plurality of optical fibers 20 to emit a collimated write beam into a parallel beam. The emitted write beam may be irradiated to the SLM 30 disposed on a front surface of the display 10.

According to another embodiment, when the plurality of optical fibers 20 are included in the SLM 30, the write beam corresponding to the hologram pattern emitted from the display 10 may be transported through the plurality of optical fibers 20 included in the SLM 30 as if it is a collimated parallel beam.

According to another embodiment, when the plurality of optical fibers 20 are included in each of the display 10 and the SLM 30, a plurality of first optical fibers provided in the display 10 and a plurality of second optical fibers provided in the SLM 30 may be implemented to correspond to each other one to one. Structures of the plurality of optical fibers 20 will be described in detail with reference to FIGS. 2A and 2B.

The SLM 30 spatially modulates an incident reproduction beam to reproduce a holographic three-dimensional image.

The SLM 30 may be implemented by including at least one of a LCD based SLM, a liquid crystal on silicon (LCoS) SLM, a dot matrix display (DMD) SLM, or an optically addressed SLM. However, since the DMD SLM, the LCoS SLM, and the like have a pixel-based minimum unit, the hologram pattern is written and reproduced in units of pixels. In this case, since a pixel size and a distance between pixels, that is, a size of a pixel pitch, are limitedly reduced, a pixel-based SLM may only provide a holographic image with a very narrow viewing angle. Therefore, it is described on the assumption that the SLM according to various embodiments of the present disclosure is implemented as an optically addressed SLM that writes and reproduces a hologram pattern by light, not a pixel.

When the write beam emitted from the display 10 passes through the plurality of optical fibers 20 and then is incident on the SLM 30, the SLM 30 according to an embodiment of the present disclosure may implement the hologram pattern corresponding to the write beam. Specifically, the SLM 30 is optically addressed by the write beam, and may generate a photocurrent at a portion irradiated with the write beam. When the photocurrent is generated, a liquid crystal arrangement inside the SLM 30 may be changed. Since the liquid crystal array is changed corresponding to the write beam, the SLM 30 may implement the hologram pattern.

Further, when a reproduction beam is incident on the SLM 30, the SLM 30 may modulate the reproduction beam into a plurality of diffraction beams corresponding to the hologram pattern and representing the reconstructed 3D holographic image. As described above, if the reproduction beam is incident in a state in which the liquid crystal array is changed, the reproduction beam irradiated on the liquid crystal inside the SLM 30 may be modulated into the plurality of diffraction beams. Here, the reproduction beam is a beam for reproducing a holographic three-dimensional image corresponding to the hologram pattern implemented in the SLM 30, and is also referred to as a reconstruction beam and a read beam.

The light guide plate 40 is configured to guide a reproduction beam emitted from a reproduction beam provider (not shown) provided on one side of the light guide plate 40 and incident on the light guide plate 40 toward the SLM 30, and may be disposed in a front surface of the SLM 30. Meanwhile, a structure of the light guide plate 40 will be described in detail with reference to FIGS. 4 and 6.

The filter 50 is configured to filter a plurality of diffraction beams and may be disposed on a front surface of the light guide plate 40. The filter 50 may include at least one of a Bragg grating filter or a louver filter. Here, the Bragg grating filter may allow a diffraction beam incident within a predetermined angle range to pass through among on the plurality of diffraction beams based on a Bragg diffraction condition (Bragg selectivity). Specifically, the Bragg grating filter may allow a diffraction beam that is not modulated into a diffraction beam in the SLM 30 and is incident within a predetermined angle range in relation to a reflected 0th order diffraction beam to pass through without refraction and may refract a diffraction beam incident beyond the predetermined angle range, for example zero order beam and conjugate image beams.

Further, the louver filter may be implemented as a sheet or a film having a light absorbing or shielding horizontal louver image structure. For example, the filter 50 includes the Bragg grating filter and the louver filter, and may be implemented to allow the louver filter to secondarily filter a diffraction beam primarily refracted by the Bragg grating filter.

The lens 60 may be disposed in a front surface of the filter 50 to focus the diffraction beam that has passed through the filter 50 to the viewing area of the user. The lens 60 may be implemented as a fresnel lens, a positive lens, a convex lens, or a field lens to focus the diffraction beam that has passed through the filter 50 to a single spot. That is, if the diffraction beam is focused on the viewing area of the user, the user may view a holographic image.

Hereinafter, each configuration of the hologram reproducing apparatus 100 will be described in detail.

Figure 2A:
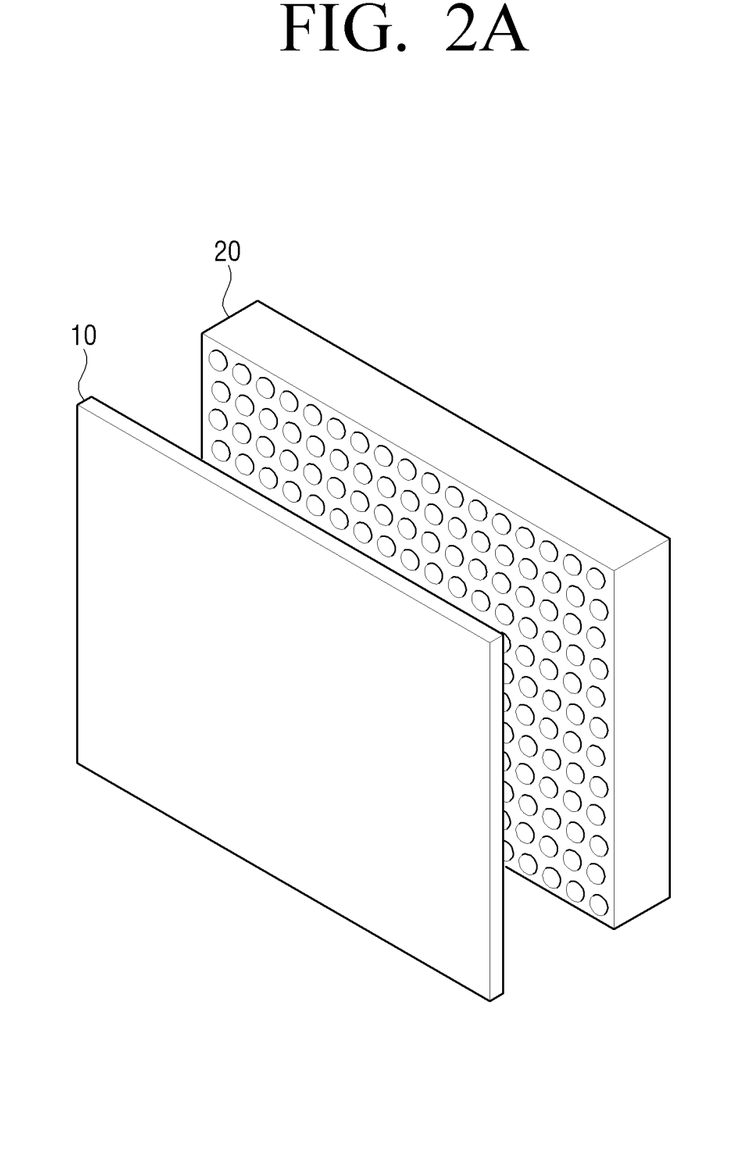
FIGS. 2A and 2B are diagrams for explaining a display and a plurality of optical fibers according to various embodiments of the present disclosure.
Figure 2B:
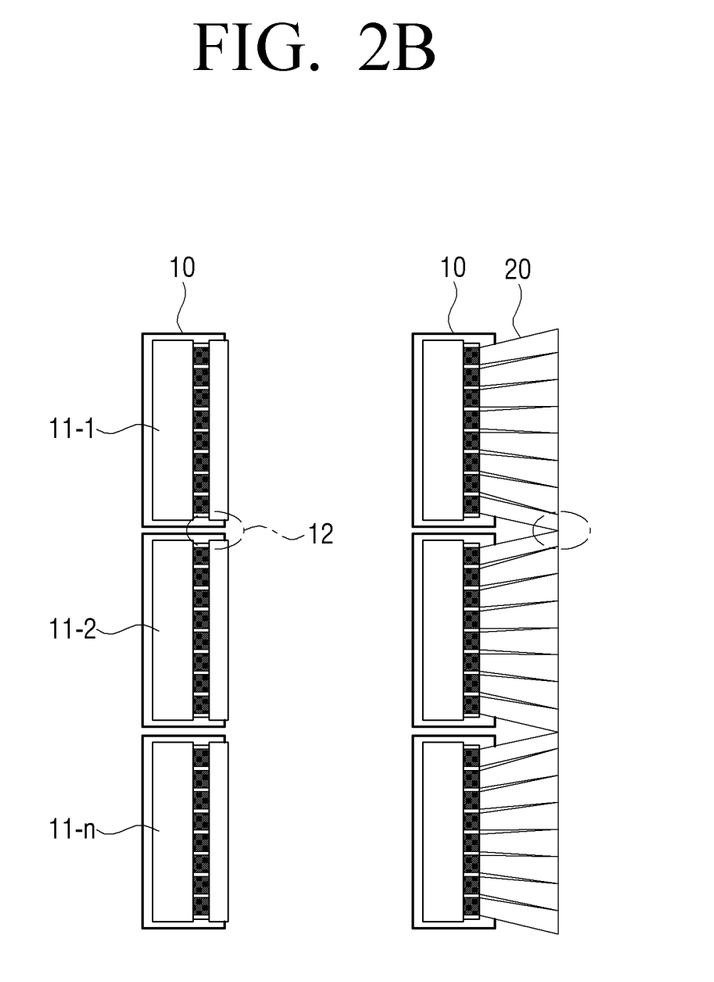

FIGS. 2A and 2B are diagrams for explaining the display 10 and the plurality of optical fibers 20 according to various embodiments of the present disclosure.

Referring to FIG. 2A, the display 10 may display a hologram pattern as described above and emit a write beam corresponding to the hologram pattern. The write beam emitted from the display 10 may be collimated into a parallel beam state by the plurality of optical fibers 20 and incident on the SLM 30. Here, the plurality of optical fibers 20 may be an optical fiber bundle in which at least one optical fiber corresponds to each of a plurality of pixels constituting the display 10. In this case, the plurality of optical fibers 20 may be implemented so that at least one or more optical fiber corresponds to one pixel. For example, an optical fiber may be implemented as a thin line of a thickness of about 1/1000 mm, made of quartz glass or other sorts of glass, having a very high transparency. A core having a high refractive index may be disposed at the center of the optical fiber, a cladding having a low refractive index may surround the core and may protect the core. A plurality of optical fibers can be assembled in a thick bundle, thermally cemented all together using light absorptive and low melting point glass thus providing glass-like optical material working as a plurality of optical fibers. This material can be cut and optically polished thus forming a fiber face-plate also known as a fiber plate.

According to an embodiment, when at least one or more optical fiber is arranged to correspond to one pixel, a write beam emitted from one pixel may be transmitted to the SLM 30 after passing through the plurality of optical fibers 20. In this case, light incident on one end of the core of the optical fiber is continuously transmitted through total reflection on a boundary surface between the core and the cladding. The optical fiber may transmit light from one side to the other side through internal total reflection.

The write beam is transmitted through the optical fiber from the display 10 to the SLM 30 and the SLM 30 may write a hologram pattern according to the write beam transmitted through the plurality of optical fibers 20.

The write beam that has passed through the plurality of optical fibers 20 and incident on the SLM 30 may write the hologram pattern a with high resolution on the SLM 30 as each of the plurality of optical fibers 20 is thin. If the hologram pattern is written with high resolution on SLM 30, diffraction of a reproduction beam may occur more easily in the SLM 30 and the reconstructed image can be seen in wider angle.

The plurality of optical fibers 20 arranged as a fiber plate may include an optical fiber having a higher resolution than the resolution of the display 10. Specifically, the plurality of optical fibers 20 may include an optical fiber plate having lp/mm (line pair per millimeter) higher than an lp/mm value of the display 10. For example, SCHOTT's 24 AS optical fiber plate material with a 203 lp/mm specification may be used.

According to an embodiment, the display 10 may be implemented to include a plurality of display modules each having peripheral inactive portions (bezels) near the outer boundary. For example, the display 10 may be implemented as an LED display assembled with a plurality of LED modules.

If bezels of the plurality of display modules are not compensated, since the SLM 30 writes a hologram pattern reflecting the inactive portions of the display modules, the completeness of a finally generated hologram may be degraded.

Accordingly, when the display 10 includes a plurality of display modules 11-1, 11-2, . . . , 11-3, as shown in FIG. 2B, the plurality of optical fibers 20 corresponding to pixels in a boundary region 12 between the plurality of display modules 11-2, 11-2, . . . , 11-3 may be implemented in a tapered shape. Here, the tapered shape means a shape in which a lower portion of the long and thin optical fiber 20 is formed narrowly, and the optical fiber 20 is relatively widened toward an upper portion and gradually spreads.

Accordingly, the assembly tolerance (or peripheral inactive portions) between the display modules is not reflected in the hologram pattern written on the SLM 30, and the hologram pattern may be seamlessly written.

Figure 3:
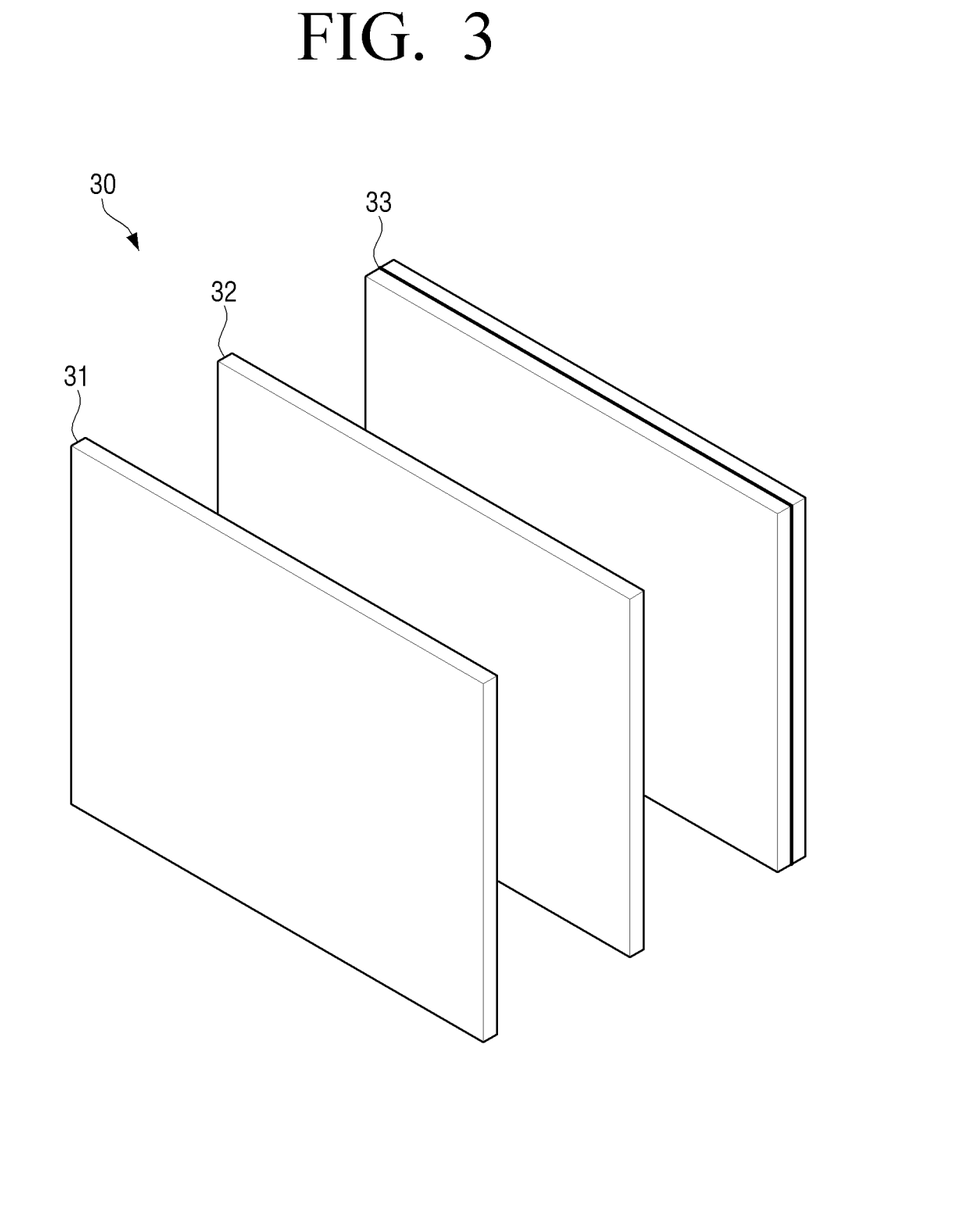
FIG. 3 is a diagram for explaining a configuration of a spatial light modulator (SLM) according to an embodiment of the present disclosure.

FIG. 3 is a diagram for explaining a configuration of the SLM 30 according to an embodiment of the present disclosure.

Referring to FIG. 3, the SLM 30 may include a photosensitive layer 31, a block filter 32, and a LCD panel (or liquid crystal layer) 33.

First, the photosensitive layer 31 may be implemented in the form of a layer including a photosensitive component sensitive to a ultraviolet (UV) beam or visible light or an infrared (IR) beam. Further, the photosensitive layer 31 may be optically addressed by a write beam emitted from the display 10 to generate a photocurrent at a portion irradiated with the write beam, and accordingly, the local amount of photocurrent may be generated corresponding to a local brightness of hologram pattern, displayed at the display 10.

The block filter (or dielectric mirror) 32 is configured to block (or reflect) the write beam (or reconstruction beam) already passed through the LCD panel and partly diffracted on the plurality of diffracted beams and may be disposed on a front surface of the photosensitive layer 31. Specifically, the block filter 32 may block a wavelength of the write beam to prevent the write beam that has passed through the photosensitive layer 31 from being irradiated to the LCD panel 33 disposed on a front surface of the block filter 32 or the like. Further, when the reconstruction beam is double passed through the liquid crystal layer toward the viewer the reconstructed image can be seen by a user.

The liquid crystal layer 33 is configured to modulate an incident reproduction beam into a plurality of diffraction beams corresponding to the hologram pattern and may be disposed on a front surface of the block filter 32.

If the photosensitive layer 31 generates the photocurrent at the portion irradiated with the write beam, an effective voltage applied to the LCD panel 33 corresponding to the photocurrent may be changed. If a reproduction beam is incident on the LCD panel 33 in a state where the effective voltage applied to the LCD panel 33 is changed, a phase, amplitude, and the like of the reproduction beam may be modulated.

For example, if the write beam is incident on the photosensitive layer 31 and resistance of the photosensitive layer 31 is reduced, a voltage drop may be changed in the LCD panel 33 and a change may occur in a liquid crystal arrangement in the LCD panel 33. Since the change of the liquid crystal arrangement in the LCD panel 33 corresponds to the hologram pattern according to the write beam, the LCD panel 33 may modulate the reproduction beam into a plurality of diffraction beams corresponding to the hologram pattern and representing the reconstructed holographic image.

The block filter (or dielectric mirror) 32 according to an embodiment of the present disclosure may further include a block filter layer (not shown) and may be implemented to allow absorption of a write beam. to prevent from being irradiated to a viewing area of user.

Figure 4:
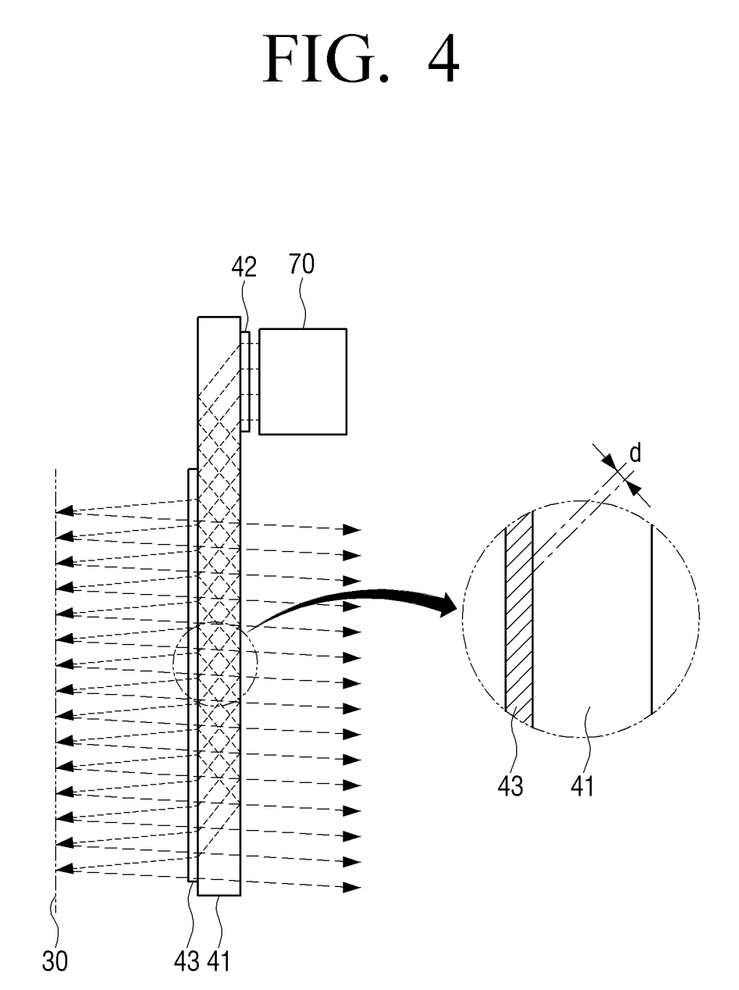
FIG. 4 is a diagram for explaining a configuration of a light guide plate according to an embodiment of the present disclosure.

FIG. 4 is a diagram for explaining a configuration of the light guide plate 40 according to an embodiment of the present disclosure.

Referring to FIG. 4, the light guide plate 40 may include an expander 41, an in-coupling element 42, and an out-coupling element 43.

First, the light guide plate 40 is configured to guide a reproduction beam from reproduction beam provider 70 toward the SLM 30 and may be disposed in a front surface of the SLM 30.

If the reproduction beam from reproduction beam provider 70 is incident through the in-coupling element 42, the light guide plate 40 may collimate the reproduction beam into a plurality of parallel beams using the expander 41 and may allow the plurality of parallel beams to be incident uniformly on a front surface of the SLM 30.

According to an embodiment of the present disclosure, the in-coupling element 42 may control the reproduction beam to be incident on the expander 41 at an incident angle within a predetermined range. On the other hand, the in-coupling element 42 may be implemented as a Bragg grating element or a prism but is not limited thereto. It should be understood that the in-coupling element 42 may be implemented as a holographic grating having a predetermined diffraction pattern or a photopolymer having a periodic refractive index distribution. Various embodiments of the in-coupling element 42 and the expander 41 are described in detail in FIG. 6.

If the reproduction beam is incident on the expander 41 within a predetermined angle range, the reproduction beam may be totally reflected inside the expander 41. In this case, the reproduction beam may be totally reflected inside the expander 41 without loss repeatedly. On the other hand, the out-coupling element 43 disposed on a rear surface of the expander 41 may discharge a part of the reproduction beam to the outside of the expander 41. In this case, the remaining part of the reproduction beam may be totally reflected in the expander 41. A process of emitting a part of the reproduction beam by the out-coupling element 43 to the outside of the expander 41 and totally reflecting the remaining part of the reproduction beam by the expander 41 is repeatedly performed, and thus the reproduction beam may be uniformly emitted to an entire region of the SLM 30.

When the reproduction beam is emitted to the outside, the out-coupling element 43 may refract and emit the reproduction beam at a predetermined angle to the outside of the expander 41. For example, the out-coupling element 43 may be implemented as a Bragg grating element, and may refract and emit the reproduction beam at a predetermined angle based on the following equation, $$\theta = \text{Arcsin}(n\lambda/2d)$$

where n denotes a refractive index of a Bragg grating, λ denotes a wavelength of a reproduction beam, and d denotes a distance between Bragg gratings.

The Bragg grating element is configured to have a selectivity based on Bragg's law ($n\lambda = 2d \sin\theta$), and may refract and emit a reproduction beam having a θ angle satisfying $n\lambda = 2d \sin\theta$.

The reproduction beam guided by the light guide plate 40 toward the SLM 30 and emitted may be modulated by the SLM 30 into a plurality of diffraction beams corresponding to the hologram pattern.

FIGS. 5A, 5B, 5C, 5D, and 6 are diagrams for explaining a configuration of the light guide plate 40 according to various embodiments of the present disclosure.

Referring to FIGS. 5A to 5D, if a reproduction beam provider 70 provides the reproduction beam to the in-coupling element 42, the in-coupling element 42 disposed on one side of the expander 41 may control an incident angle of the reproduction beam to fall within a predetermined angle range. Here, the reproduction beam provider 70 may sequentially provide R, G, and B reproduction beams, and accordingly a hologram reproduction apparatus according to an embodiment of the present disclosure may reproduce a color holographic three-dimensional image.

Figure 5A:
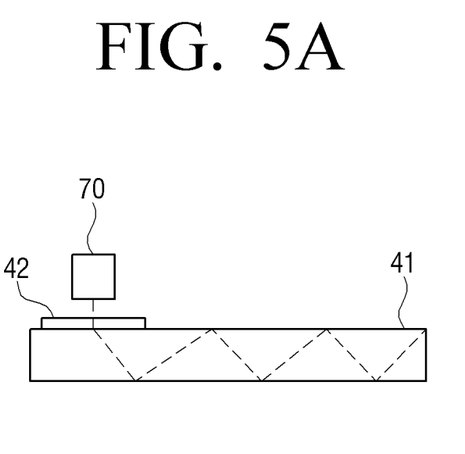
FIGS. 5A, 5B, 5C, 5D, and 6 are diagrams for explaining a configuration of a light guide plate according to various embodiments of the present disclosure.

As shown in FIG. 5A, the in-coupling element 42 may be implemented as a Bragg grating element. In this case, as described above, the Bragg grating element may refract the reproduction beam at a predetermined angle to allow the reproduction beam incident on the expander 41, and the reproduction beam incident on the expander 41 may be totally reflected in the expander 41 repeatedly.

Figure 5B:
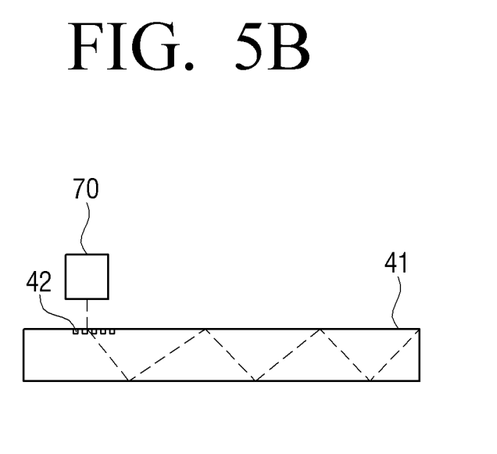

Further, according to another embodiment of the present disclosure, the in-coupling element 42 may be implemented as a holographic grating having a predetermined diffraction pattern or a photopolymer having a periodic refractive index distribution. In this case, as shown in FIG. 5B, the in-coupling element 42 may be disposed on one surface inside the expander 41.

Figure 5C:
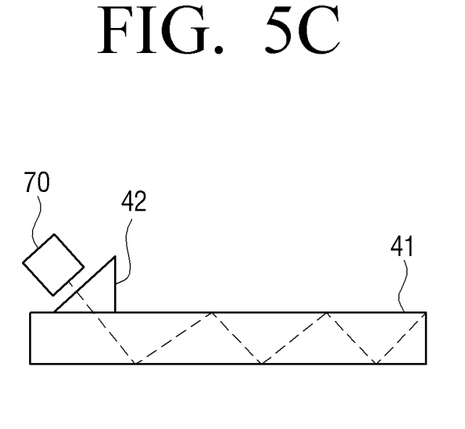

Further, as shown in FIG. 5C, the in-coupling element 42 may be implemented as a prism. The reproduction beam scanned with the prism may be refracted through the prism and incident on the expander 41.

Figure 5D:
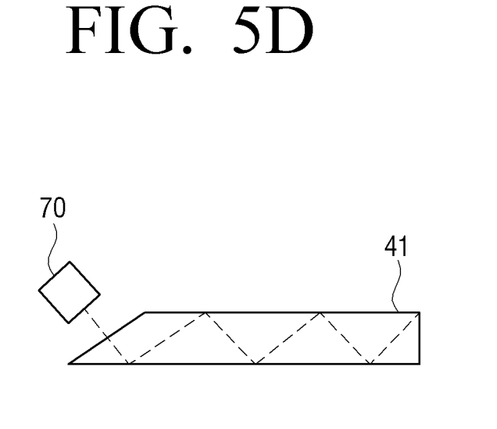

On the other hand, as described above, the light guide plate 40 is not necessarily limited to the configuration including the in-coupling element 42. For example, as shown in FIG. 5D, the light guide plate 40 may not include the in-coupling element 42. In this case, the reproduction beam directly irradiated to one side of the expander 41 may be totally reflected inside the expander 41 repeatedly.

Figure 6:
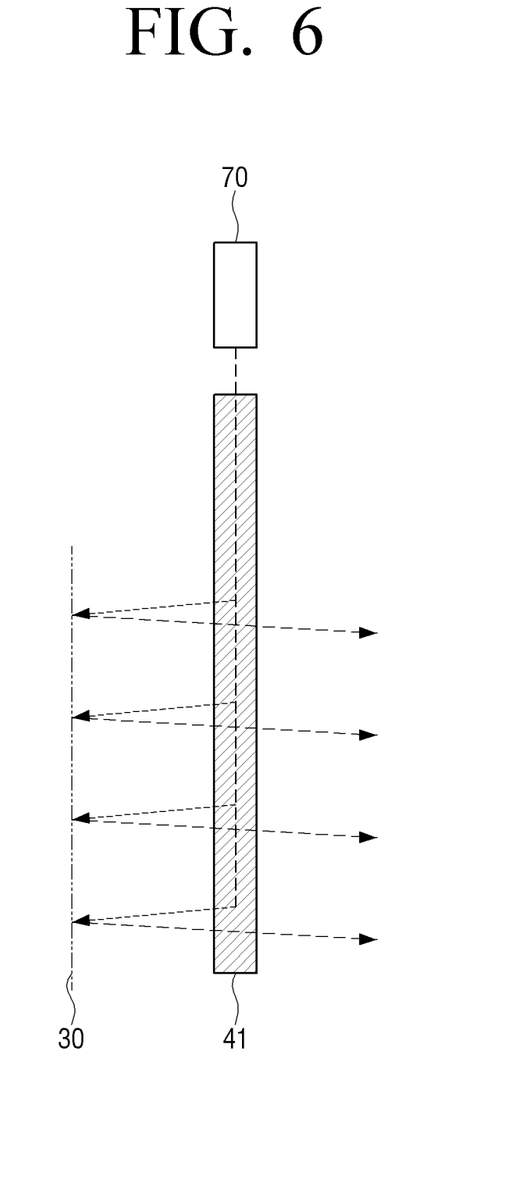

Meanwhile, as shown in FIG. 6, the light guide plate 40 itself may be implemented as a Bragg grating element. In this case, the light guide plate 40 implemented as the Bragg grating element may perform both functions of the expander 41 and the out-coupling element 43. Specifically, if the write beam is incident on the light guide plate 40, the light guide plate 40 implemented as the Bragg grating element may refract and emit the write beam at a predetermined angle. A process of emitting a part of the reproduction beam by a first grating among Bragg gratings to the outside of the light guide plate 40 and emitting the remaining part of the reproduction beam by a next grating after passing through the first grating to the outside of the light guide plate 40 may repeatedly performed, without a process of totally reflecting the reproduction beam inside the light guide plate 40 repeatedly. In this case, the reproduction beam may be uniformly emitted to an entire region of the SLM 30.

Figure 7:
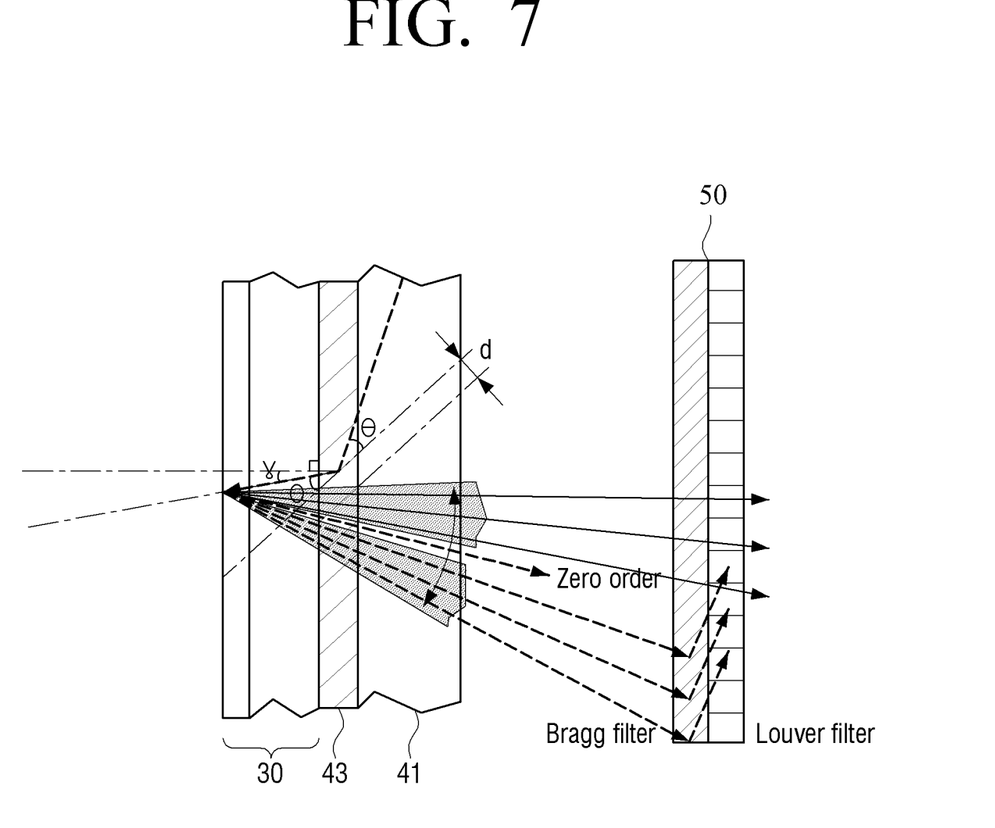
FIG. 7 is a diagram for explaining a configuration of a filter according to an embodiment of the present disclosure.

FIG. 7 is a diagram for explaining a configuration of the filter 50 according to an embodiment of the present disclosure.

Referring to FIG. 7, the filter 50 may perform filtering on a plurality of diffraction beams modulated in the SLM 30. The filter 50 according to an embodiment of the present disclosure may include at least one of a Bragg grating filter or a louver film.

For example, if the filter 50 includes the Bragg grating filter, the Bragg grating filter may pass a diffraction beam incident within a predetermined angle range among the plurality of diffraction beams and may refract a diffraction beam incident beyond the predetermined angle range.

Specifically, if the out-coupling element 43 refracts and emits the reproduction beam at a predetermined angle θ, a certain angle difference γ between the reproduction beam emitted at the predetermined angle θ and an imaginary line perpendicular to the out-coupling element 43 may be present. In this case, the Bragg grating filter may allow a diffraction beam incident at an incidence angle within the range of 0<γ in relation to a zero order diffraction beam among the plurality of diffraction beams to pass through without refraction. Here, the zero order diffraction beam means a reproduction beam in which the reproduction beam is not modulated into a diffraction beam by the SLM 30 but is reflected as it is.

Hereinafter, for convenience of explanation, in relation to the zero order diffraction beam, a diffraction beam incident on the Bragg grating filter at an incidence angle within a range of 0<θ1<γ is referred to as a first diffraction beam, and a diffraction beam incident on the Bragg grating filter at an incidence angle within a range of −γ<θ1<0 is referred to as a −1 order diffraction beam.

The −1 order diffraction beam and the zero order diffraction beam correspond to a diffraction beam that overlaps a holographic three-dimensional image and causes image quality degradation. Therefore, if the −1 order diffraction beam and the zero order diffraction beam are refracted by the Bragg grating filter, a high resolution three-dimensional image may be provided to a user by the zero order diffraction beam that has passed through the Bragg grating filter without refraction.

For example, when the specific angle difference γ is 5-10°, the Bragg grating filter may allow a diffraction beam incident at an incidence angle of 5-10° to pass through, thereby preventing crosstalk between the plurality of diffraction beams, image quality degradation, etc. On the other hand, the predetermined angle and the specific angle difference are not fixed values and may be changed according to a change of the viewing area of the user, a setting, a change of constituent elements, a distance between Bragg gratings, a refractive index of a Bragg grating, a wavelength of the reproduction beam, etc.

The Bragg grating filter according to another embodiment of the present disclosure may have a distance between gratings of the Bragg grating included in the out-coupling element 43, a distance between Bragg gratings different from a refractive index of the Bragg grating, a refractive index of the Bragg grating, etc. In this case, the predetermined angle range through which the Bragg grating filter allows the diffraction beam to pass without refraction may be determined by a distance between Bragg gratings of the Bragg grating filter, a refractive index of the Bragg grating, and the like.

When the filter 50 includes the louver film according to another embodiment of the present disclosure, the louver film may perform filtering on the plurality of diffraction beams. Here, the louver film is a film in which a plurality of blind patterns are arranged at regular intervals. Thus, filtering may be performed such that only some of the plurality of diffraction beams passes between the blind patterns. It is needless to say that an interval between the blind patterns may be changed based on the viewing area of the user, a viewing purpose, etc.

As shown in FIG. 7, the filter 50 may include both the Bragg grating filter and the louver film, and may perform second filtering on a diffraction film primarily filtered by the Bragg grating filter using the louver film. For example, if the zero order diffraction beam and the −1 order diffraction beam are refracted by the Bragg grating filter, the louver film may filter the refracted diffraction beams to prevent the refracted diffraction beams from being provided to the viewing area of the user.

The diffraction beam that has passed through the filter 50 may be focused onto the viewing area of the user through the lens 60 disposed on a front surface of the filter 50 and reproduced as a three-dimensional holographic image.

Figure 8:
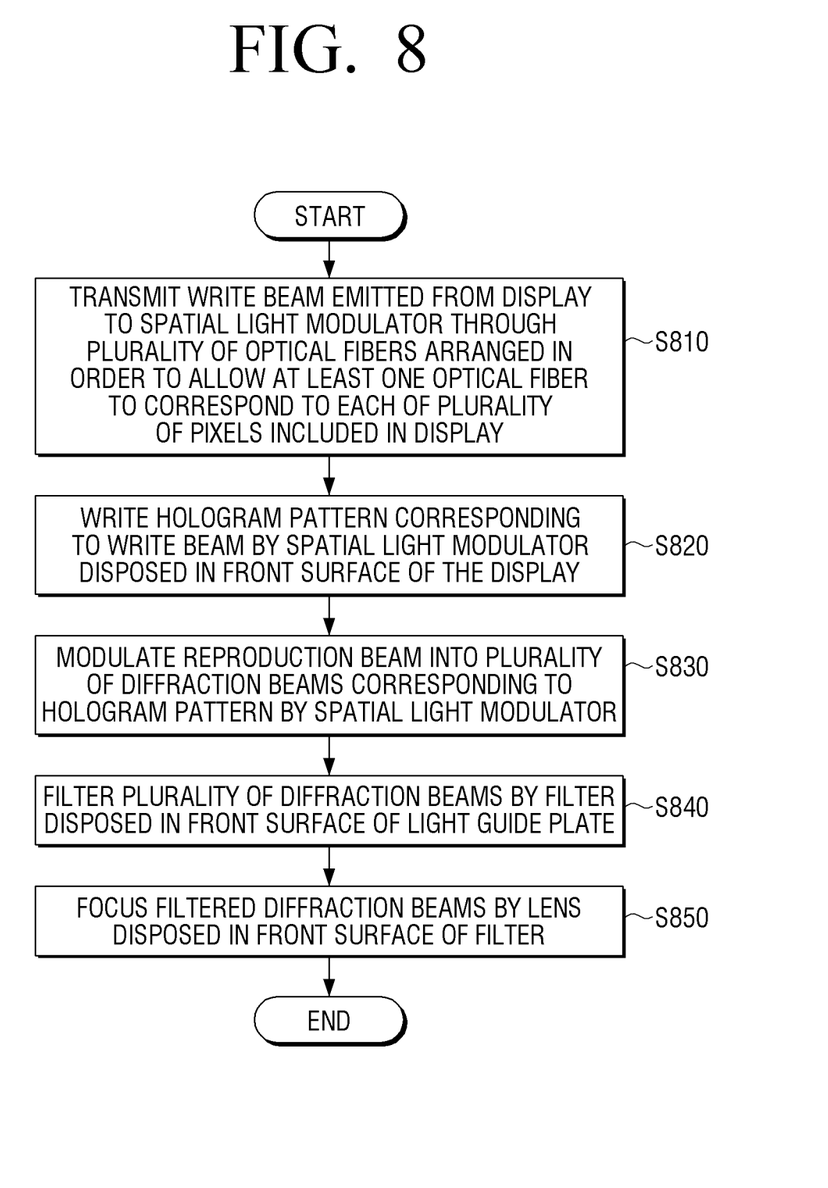
FIG. 8 is a flowchart for explaining a control method according to an embodiment of the present disclosure.

FIG. 8 is a flowchart illustrating a control method according to an embodiment of the present disclosure.

Referring to FIG. 8, a control method of a hologram reproducing apparatus including a display for displaying a CGH pattern and emitting a write beam corresponding to the hologram pattern transmits the write beam emitted from the display to a SLM through a plurality of optical fibers arranged in order to allow at least one optical fiber to correspond to each of a plurality of pixels constituting the display at operation S810.

Then, a hologram pattern corresponding to the write beam is written by the SLM disposed in a front surface of the display at operation S820.

Subsequently, the reproduction beam incident on the SLM is modulated into a plurality of diffraction beams corresponding to the hologram pattern at operation S830.

Subsequently, the plurality of diffraction beams are filtered by a filter disposed in a front surface of a light guide plate at operation S840.

Next, the diffraction beam filtered by a lens disposed in a front surface of the filter is focused at operation S850.

Further, the display includes a display panel configured to display the hologram pattern, and the plurality of optical fibers may be disposed in a front surface of the display panel facing the SLM.

Further, the SLM includes a photosensitive layer configured to write the hologram pattern according to the write beam, a block filter disposed in a front surface of the photosensitive layer and configured to block the write beam, and a LCD panel disposed in a front surface of the block filter and configured to modulate the incident reproduction beam into the plurality of diffraction beams corresponding to the hologram pattern, wherein the plurality of optical fibers may be disposed in a rear surface of the photosensitive layer facing the display.

Also, the light guide plate provided on the front surface of the SLM includes an expander and an out-coupling element, and the control method may further include collimating the reproduction beam by the expander and making the reproduction beam uniformly incident on the front surface of the SLM, and refracting the reproduction beam incident on the expander by the out-coupling element disposed in a rear surface of the expander at a predetermined angle and emitting the reproduction beam to the outside of the expander.

Further, the reproduction beam may be emitted after being refracted at the predetermined angle based on the following equation.

$$\theta = \text{Arcsin}(n\lambda/2d)$$

wherein, n is a refractive index of the Bragg grating, $\lambda$ denotes a wavelength of the reproduction beam, and d is a distance between Bragg gratings.

Further, the filter may include a Bragg grating filter. If the plurality of diffraction beams are incident, the Bragg grating filter may allow a diffraction beam that is incident within a predetermined angle to pass through in relation to a zero order diffraction beam among the plurality of diffraction beams. The zero order diffraction beam is a beam in which the reproduction beam is reflected without being modulated to a diffraction beam in the SLM.

Further, the filter may further include a louver film disposed in a front surface of the Bragg grating filter and configured to secondarily filter the diffraction beam primarily filtered through the Bragg grating filter.

On the other hand, the display may be implemented as a self-luminous element that emits the write beam corresponding to the hologram pattern.

Further, the light guide plate according to another embodiment of the present disclosure may be implemented as a Bragg grating element. The control method may further include refracting the reproduction beam at a predetermined angle by the Bragg grating element and emitting the reproduction beam toward the SLM.

As described above, according to various embodiments of the present disclosure, the hologram reproducing apparatus may be miniaturized and may provide a high-quality holographic image.

Hereinabove, although various embodiments of the present disclosure are separately described, each of the embodiments does not necessarily need to be solely implemented, but a configuration and an operation of each of the embodiments may also be implemented to be combined with one or more other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A hologram reproducing apparatus, wherein a front of the hologram reproducing apparatus is where a hologram appears, comprising:
   a display configured to emit a write beam corresponding to a hologram pattern;
   a reproduction beam provider configured to emit a reproduction beam;
   a spatial light modulator (SLM) disposed in front of the display, and configured to:
      write the hologram pattern according to the write beam emitted from the display, and
      modulate the reproduction beam into a plurality of diffraction beams corresponding to the hologram pattern if the reproduction beam is incident;
   a light guide plate disposed in front of the SLM, and configured to guide the reproduction beam toward the SLM;
   a filter disposed in front of the light guide plate, and configured to filter the plurality of diffraction beams;
   a lens configured to focus the plurality of diffraction beams filtered through the filter; and
   a plurality of optical fibers arranged to dispose at least one optical fiber to correspond to each of a plurality of pixels included in the display, and configured to transmit the write beam to the SLM,
   wherein the plurality of optical fibers is implemented as a tapered fiber face late.

2. The hologram reproducing apparatus as claimed in claim 1,
   wherein the display comprises a display panel configured to display the hologram pattern, and
   wherein the plurality of optical fibers are arranged at a front surface of the display panel facing the SLM.

3. The hologram reproducing apparatus as claimed in claim 2,
   wherein the display panel comprises a plurality of display modules.

4. The hologram reproducing apparatus as claimed in claim 1,
   wherein SLM comprises:
      a photosensitive layer configured to write the hologram pattern according to the write beam,
      a block filter disposed at a front surface of the photosensitive layer, and configured to block the write beam, and
      a liquid crystal display (LCD) panel disposed on a front surface of the block filter to modulate an incident reproduction beam into a plurality of diffraction beams corresponding to the hologram pattern, and
   wherein the plurality of optical fibers are arranged at a rear surface of the photosensitive layer facing the display.

5. The hologram reproducing apparatus as claimed in claim 1,
   wherein the light guide plate comprises:

an expander configured to collimate the reproduction beam to make the reproduction beam uniformly incident on a front surface of the SLM; and an in-coupling element configured to allow an incidence angle of the reproduction beam incident on the expander to fall within a predetermined angle range, and wherein the in-coupling element is implemented as a Bragg grating element or a prism.

6. The hologram reproducing apparatus as claimed in claim 1, wherein the light guide plate comprises:

an expander and an out-coupling element, wherein the light guide plate is configured to collimate the reproduction beam to make the reproduction beam uniformly incident on front of the SLM, and the out-coupling element disposed at a rear surface of the expander to refract the reproduction beam incident on the expander at a predetermined angle and emit the reproduction beam to an outside of the expander, and wherein the out-coupling element is a Bragg grating element.

7. The hologram reproducing apparatus as claimed in claim 6, wherein the out-coupling element refracts and emits the reproduction beam incident on the expander at the predetermined angle based on an equation, $$\theta = \text{Arcsin}(n\lambda/2d)$$

wherein, n denotes a refractive index of the Bragg grating element, $\lambda$ denotes a wavelength of the reproduction beam, and d denotes a lattice separation distance in the Bragg grating elements.

8. The hologram reproducing apparatus as claimed in claim 1, wherein the filter comprises a Bragg grating filter, and wherein, if the plurality of diffraction beams are incident, the Bragg grating filter allows a diffraction beam incident within a predetermined angle range to pass through based on a zero order diffraction beam among the plurality of diffraction beams.

9. The hologram reproducing apparatus as claimed in claim 8, wherein the filter further comprises a louver film disposed at a front surface of the Bragg grating filter to secondarily filter the diffraction beam primarily filtered through the Bragg grating filter.

10. The hologram reproducing apparatus as claimed in claim 1, wherein the display is a self-luminous display that emits the write beam corresponding to the hologram pattern.

11. The hologram reproducing apparatus as claimed in claim 1, wherein the light guide plate is implemented as a Bragg grating element to refract the reproduction beam at a predetermined angle and emit the reproduction beam toward the SLM.

* * * * *